US006978590B1

(12) United States Patent
Graham

(10) Patent No.: US 6,978,590 B1
(45) Date of Patent: Dec. 27, 2005

(54) LAWN MOWER BLADE IMPROVEMENT

(76) Inventor: John Graham, 269035 Hwy. 101, Sequim, WA (US) 98382

( * ) Notice: Subject to any disclaimer, the term of this patent is extended or adjusted under 35 U.S.C. 154(b) by 0 days.

(21) Appl. No.: 10/993,621

(22) Filed: Nov. 19, 2004

(51) Int. Cl.[7] .................. A01D 34/52; A01D 34/73
(52) U.S. Cl. ................................................ 56/295
(58) Field of Search ..................... 56/255, 256, 295

(56) References Cited

U.S. PATENT DOCUMENTS

| 2,281,278 | A | * | 4/1942 | Finnell ................ 15/93.1 |
| 2,863,162 | A | | 12/1958 | Draughton |
| 2,924,059 | A | * | 2/1960 | Beeston, Jr. ............. 56/295 |
| 2,957,295 | A | * | 10/1960 | Brown ................. 56/13.4 |
| 3,117,633 | A | | 1/1964 | Hosek |
| 3,184,903 | A | | 5/1965 | Fjelstad |
| 3,396,518 | A | | 8/1968 | Johnson |
| 3,477,214 | A | | 11/1969 | Rogers |
| 3,511,036 | A | | 5/1970 | Julian |
| 3,589,112 | A | | 6/1971 | Frohmader |
| 3,611,691 | A | | 10/1971 | Howard |
| 3,621,642 | A | | 11/1971 | Leake |
| 3,742,688 | A | * | 7/1973 | Tonjes, Jr. ............. 56/193 |
| 3,753,338 | A | * | 8/1973 | Sherratt ................ 56/17.5 |
| 3,753,341 | A | | 8/1973 | Berg, Jr. et al. |
| 3,857,226 | A | | 12/1974 | Sifakas |
| 3,916,607 | A | * | 11/1975 | Howard ................ 56/17.5 |
| 3,918,242 | A | | 11/1975 | Harris |
| 3,959,954 | A | | 6/1976 | Halsten |
| 3,959,955 | A | | 6/1976 | Smith et al. |
| 3,964,243 | A | * | 6/1976 | Knipe .................. 56/17.5 |
| 4,058,959 | A | | 11/1977 | Moss et al. |
| 4,062,114 | A | | 12/1977 | Luick |
| 4,086,700 | A | | 5/1978 | Inada |
| 4,269,020 | A | * | 5/1981 | Wolf ................... 56/295 |
| 4,295,324 | A | | 10/1981 | Frantello et al. |
| 4,374,465 | A | | 2/1983 | Comer |
| 4,409,781 | A | | 10/1983 | Blackstone |
| 4,450,673 | A | | 5/1984 | Hutchison |
| 4,461,138 | A | | 7/1984 | Whitman |
| 4,513,563 | A | | 4/1985 | Roser et al. |

(Continued)

Primary Examiner—Árpád Fábián Kovács
(74) Attorney, Agent, or Firm—Innovation Law Group, Ltd.; Jacques M. Dulin, Esq.

(57) ABSTRACT

A lawn mower blade assembly is described that comprising a generally flat, elongated blade having a central mounting opening for mounting of the blade to a rotating motor shaft of a lawn mower. The blade further includes a plurality of bit openings positioned along the blade, and a plurality of elongated, generally cylindrical bits for insertion into the bit openings. Each bit has a head and a plurality of rib protrusions located slightly away from the head at one end of the bit. Each bit is inserted into one of the bit openings from the bottom side of the blade, past the rib protrusions, and snapped into place against the head. As such, each bit is held in place in the bit opening by the rib protrusions and the head. The bit, once installed, each extend generally perpendicularly from the top surface of the blade. The bits are each long enough such that when the bald assembly is installed in a lawm mower, the distal end of the bits make contact with and bend over slightly against an underside of a blade compartment of the lawn mower. When the blade is rotating, grass or other lawn debris, particularly wet such debris, is prevented from sticking to and building up upon the underside. The blade may further include a lifted flange at trailing edges of the blade that provide a high velocity air stream within a blade compartment of the lawn mower to further prevent the build-up of wet grass or the like within the compartment.

12 Claims, 3 Drawing Sheets

U.S. PATENT DOCUMENTS

| | | | |
|---|---|---|---|
| 4,610,129 A | 9/1986 | Bolger et al. | |
| 4,644,655 A | 2/1987 | Bottamiller et al. | |
| 4,756,146 A | 7/1988 | Rouse | |
| 4,909,024 A | 3/1990 | Jones et al. | |
| 4,936,884 A | 6/1990 | Campbell | |
| 4,938,012 A | 7/1990 | Klima | |
| 4,962,630 A | 10/1990 | Jones | |
| 5,040,315 A | 8/1991 | Matson | |
| 5,048,276 A | 9/1991 | Miller | |
| 5,123,236 A * | 6/1992 | Bablitz | 56/17.5 |
| 5,233,820 A | 8/1993 | Willsie | |
| 5,269,127 A * | 12/1993 | Miles, Jr. | 56/502 |
| 5,479,763 A | 1/1996 | Coble | |
| 5,483,790 A | 1/1996 | Kuhn et al. | |
| 5,491,962 A | 2/1996 | Sutliff et al. | |
| 5,649,413 A | 7/1997 | Oostendorp | |
| 5,661,962 A * | 9/1997 | Monaco | 56/16.9 |
| 5,701,728 A | 12/1997 | Koka et al. | |
| 5,761,892 A * | 6/1998 | Quiroga | 56/17.5 |
| 5,832,704 A | 11/1998 | Routh | |
| 5,907,947 A | 6/1999 | Poole et al. | |
| 5,970,693 A | 10/1999 | Ciaglo | |
| 6,038,842 A | 3/2000 | Quiroga | |
| 6,364,960 B1 | 4/2002 | Bayley | |
| 6,490,850 B1 | 12/2002 | Seegert et al. | |
| 6,539,694 B2 | 4/2003 | Oxley | |

* cited by examiner

LAWN MOWER BLADE IMPROVEMENT

FIELD OF THE INVENTION

The present invention relates generally to lawn mower blades and, more particularly, to an improved self-cleaning lawn mower blade assembly.

DISCUSSION OF RELATED ART

Many lawn mower users know the frustration caused when grass and other yard debris builds-up on the underside of the lawn mower blade compartment. Not only can such build-up clog grass discharge chutes, necessitating the manual removal thereof, but grass clumps may form that eventually break free and land on the freshly cut grass, giving the just-mowed lawn a clumpy look. This problem is even more apparent when the grass being cut is wet, as in the morning or just after having been watered. Gardens do not always have control of the sprinkler system timing for the lawns that they mow, so cutting wet grass is often required due the time constraints that most gardens face.

There are many prior art devices that aim to reduce or eliminate the problem of grass build-up within the mower. Fox example, U.S. Pat. No. 2,957,295 to Brown on Oct. 25, 196, and U.S. Pat. No. 3,396,518 to Johnson on Aug. 13, 1968, teach blades that clean the underside of the lawnmower by scraping. As pointed out by Smith et. al in their U.S. Pat. No. 3,959,955 on Jun. 1, 1976, such scraping devices are ineffective when the underside of the lawn mower is not flat, and when rocks or other debris cause the cleaning scraper to jam.

However, the Smith et al. device is not much improved, as it requires a flat deck assembly to remain within ¼ of an inch from the ends of a plurality of metal pins that are attached to a top surface of the blade and oriented upward towards the deck assembly. If there is no flat deck assembly, such as is often the case when adding a cleaning blade to an existing lawn mower, the Smith et al. device is only marginally better at reducing grass build-up. Further, the metal pins of the Smith et al. device are rigid and as such can be readily damaged when contacting rocks or other relatively dense lawn debris. Pins of this type, particularly consider the manner in which they are mounted to the blade, are not easy nor inexpensive to replace. Moreover, the pins of such a device, while disclosed as being able to "whip through" and angle of about 30°, in practice are forced to remain at their outwardmost position of 15° with respect to vertical due to the centrifugal force generated by the rotating blade. Pins are then effectively locked into this position once debris enters and jams the pin holding mechanism of such devices. This limits the pins' cleaning path to thin circumferences along the top deck.

Other prior art devices teach radially spaced flexible elements extending radially from the shaft of the mower and above the blade. For example, see U.S. Pat. No. 6,539,694 to Oxley on Apr. 1, 2003 and U.S. Pat. No. 5,483,790 to Kuhn et al., on Jan. 16, 1996. Yet, such devices do not teach scraping as a method of reducing grass build-up; indeed, such items teach against scraping due to complications with the shape of the underside of the blade compartments of conventional mowers.

Other prior art devices disclose mower heads that have monofilament cutting lines extending radially therefrom. Such device, as taught in U.S. Pat. No. 4,295,324 to Frantello et al., on Oct. 20, 1981 and U.S. Pat. No. 4,962,630 to Jones on Oct. 16, 1990, are well suited for cutting grass, but not for cleaning already cut grass from the underside of a mower through scraping. Monofilament lines are easily frayed or cut when coming into contact with metal, such as that of the undersides of mowers. As such, they are not well suited for constant contact with the underside of the mower, nor are they resilient enough to adequately scrape the underside of the mower if used for such a purpose.

Adding any element to a rotating blade for cleaning or any other purposes must be done carefully so as to allow the mower to maintain the American National Standards Institute (ANSI) safety regulations for blade stopping time. With added mass comes added rotational inertia, which adds stopping time to a rotating blade. As such, any cleaning attachment must necessarily have low mass in order to keep the mower in compliance with ANSI or other safety standards.

Therefore, there is a need for an improved, inexpensive lawn mower blade assembly that cleans the underside of the mower regardless of the shape of the underside of the blade compartment. Such a needed device would provide a means for scraping even wet clumping grass from the underside of the mower and prevent or reduce clogging of the discharge chute for grass clippings. The needed improvement would be easily repaired with inexpensive parts when damaged by rocks, or the like, and would be not noticeably increase the noise associated with running such a mower. Further, the needed improvement, when retrofitted to an existing mower, would not cause the existing mower to exceed the ANSI requirements for blade stopping time for outdoor power equipment. The present invention accomplishes these objectives.

SUMMARY OF THE INVENTION

The present device is a lawn mower blade assembly that comprising a generally flat, elongated blade that has a central mounting opening for mounting of the blade to a rotating motor shaft of a lawn mower. The blade further includes a plurality of bit openings positioned along the blade, and a plurality of elongated, generally cylindrical bits are included for insertion into the bit openings. Each bit has a head and a plurality of rib protrusions located slightly away from the head at one end of the bit. Each bit is inserted into one of the bit openings from the bottom side of the blade, past the rib protrusions, and snapped into place against the head. As such, each bit is held in place in the bit opening by the rib protrusions and the head. The bits, once installed, each extend generally perpendicularly from the top surface of the blade.

The bits are each long enough such that when the blade assembly is installed in a lawn mower, the distal end of the bits make contact with and bend over slightly against an underside of a blade compartment of the lawn mower. As such, when the blade is rotating, grass or other lawn debris, particularly wet such debris, is prevented from sticking to and building up upon the underside.

The blade may further include a lifted flange at trailing edges of the blade that provide a high velocity air stream within a blade compartment of the lawn mower to further prevent the build-up of wet grass or the like within the compartment. Preferably, the arrangement of the bit openings along the longitudinal axis of the blade is symmetrical with respect to the central mounting opening. Further, the bits are preferably made from a material that is resilient enough to not create an inordinate amount of additional sound when contacting and scraping along the underside of the blade compartment.

The present invention is an improved, inexpensive lawn mower blade assembly that cleans the underside of mowers having a wide variety of underside shapes. The present device provides a means for scraping even wet clumping grass from the underside of the mower and reduces clogging of the discharge chute for grass clippings. The device is easily repaired if the bits are damaged by rocks, or the like, and such bits are inexpensive to produce. Further, when the blade of the present invention is retrofitted to an existing mower, it's low additional mass does not cause existing mowers to exceed the ANSI requirements for blade stopping time for outdoor power equipment. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Figure 1:
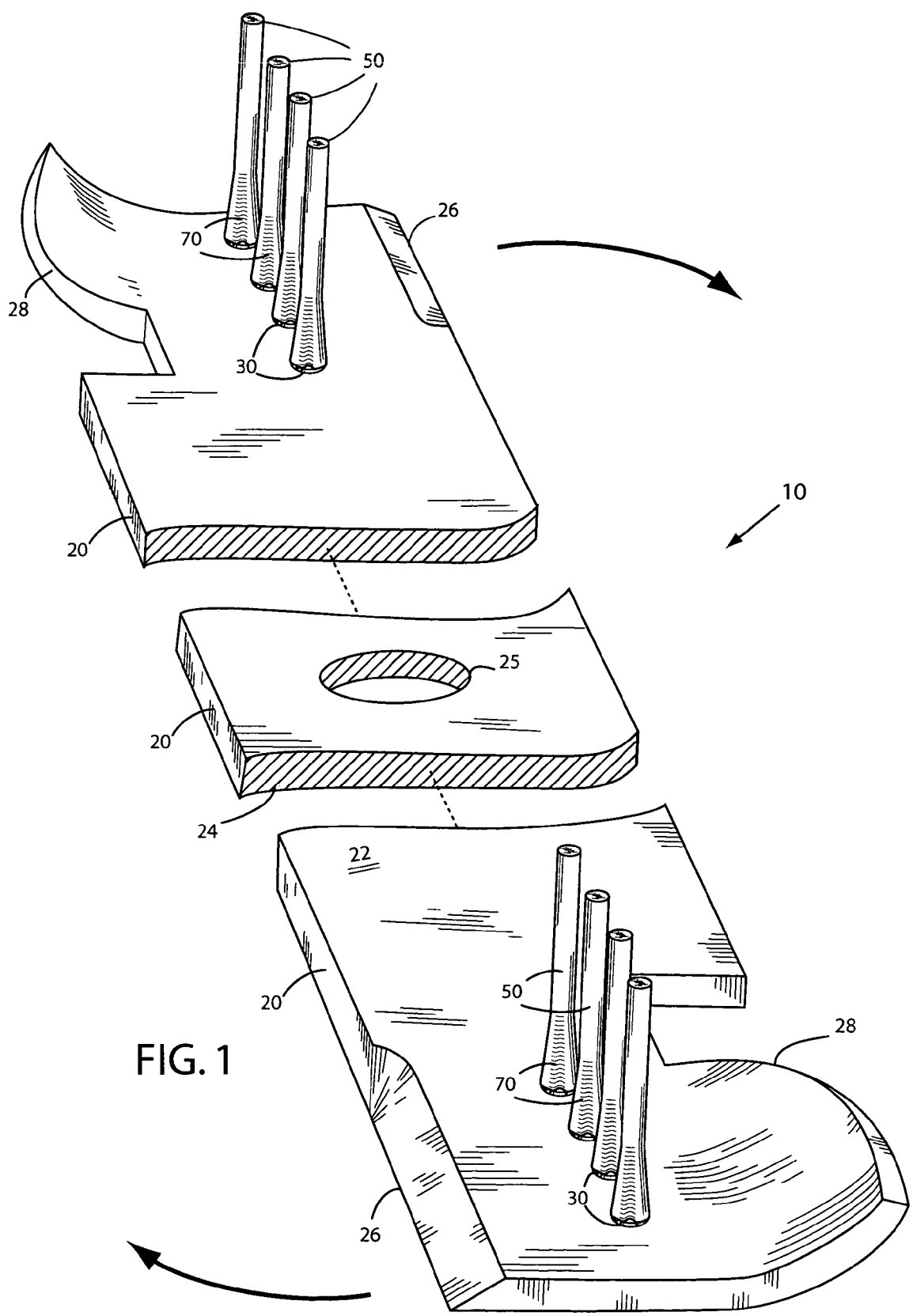
FIG. 1 is a partial perspective illustration of a lawn mower blade of the present invention.
Figure 4:
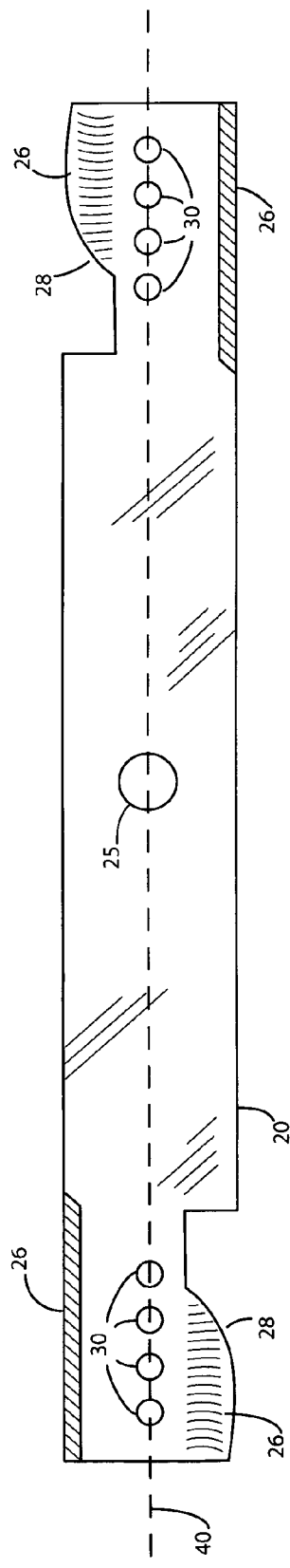
FIG. 4 is a top plan view of the lawn mower blade of the present invention, illustrating bit openings for receiving the plurality of lawn mower blade bits.
Figure 5:
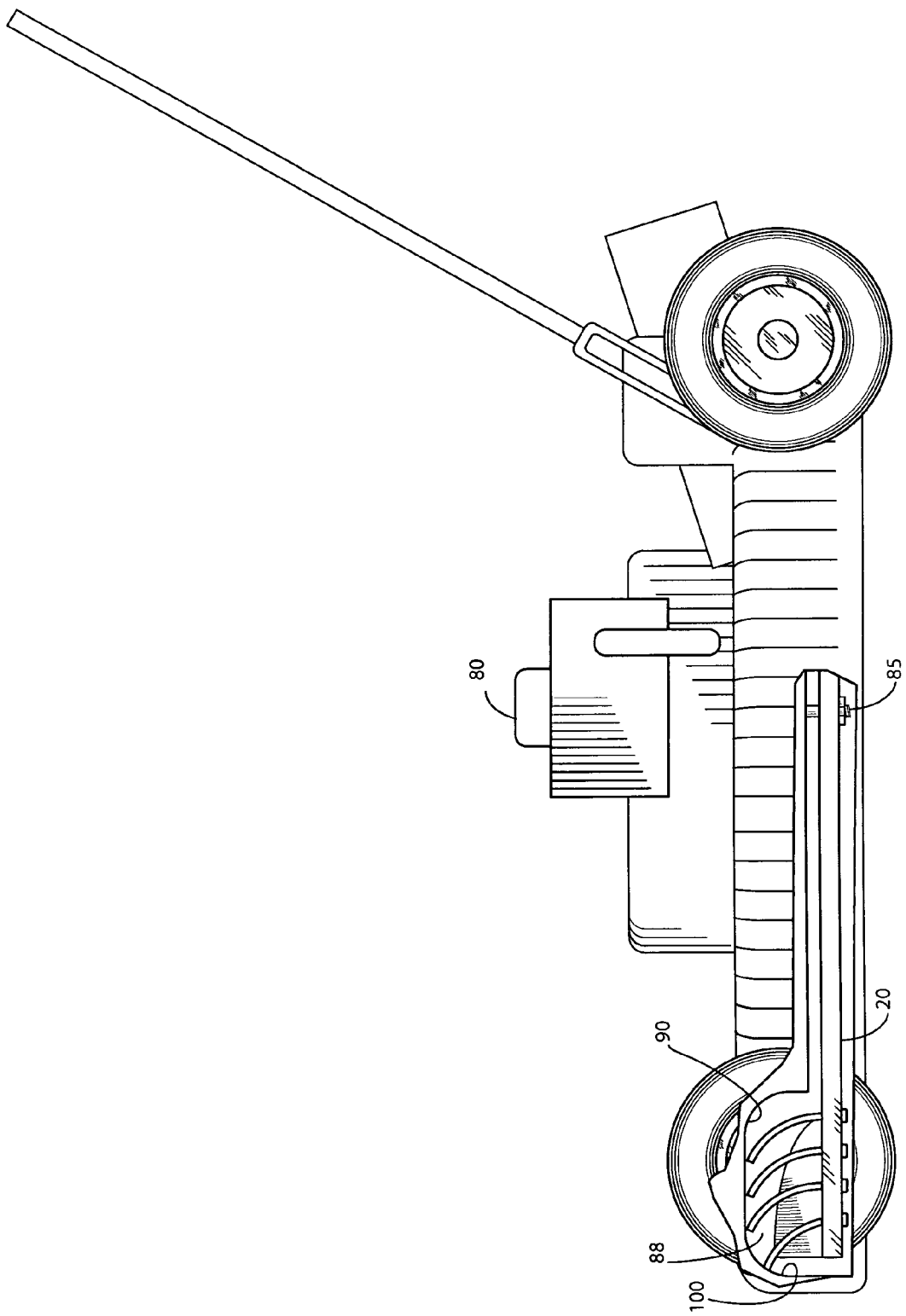
FIG. 5 is a side elevational view of the invention, partially broken away to reveal a lawn mower blade assembly of the present invention as installed in a lawn mower.

The present invention is a lawn mower blade assembly 10, comprising a generally flat, elongated blade 20 that includes a central mounting opening 25 for mounting of the blade 20 to a rotating motor shaft 85 I can't find 85 on the drawing of a lawn mower 80 (FIGS. 1 and 5). The blade 20 further includes a plurality of bit openings 30 positioned along the longitudinal axis 40 I can't find 40 on the drawing of the blade 20 (FIG. 4). The central mounting opening 25 and each bit opening 30 completely traverse the blade 20 from a bottom side 24 to a top side 22. The blade 20 is preferably formed from a hardened metal alloy that can retain sharpened cutting edges 26 and withstand the rigors of cutting and impacting vegetation and lawn debris at high speeds.

Figure 3:
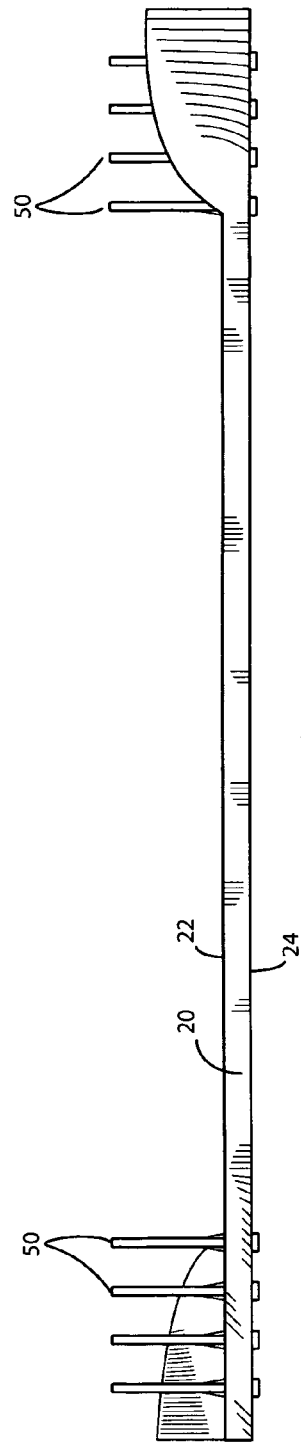
FIG. 3 is a front elevational view of the invention, illustrating a plurality of lawn mower blade bits as installed in a lawn mower blade of the present invention.
Figure 2:
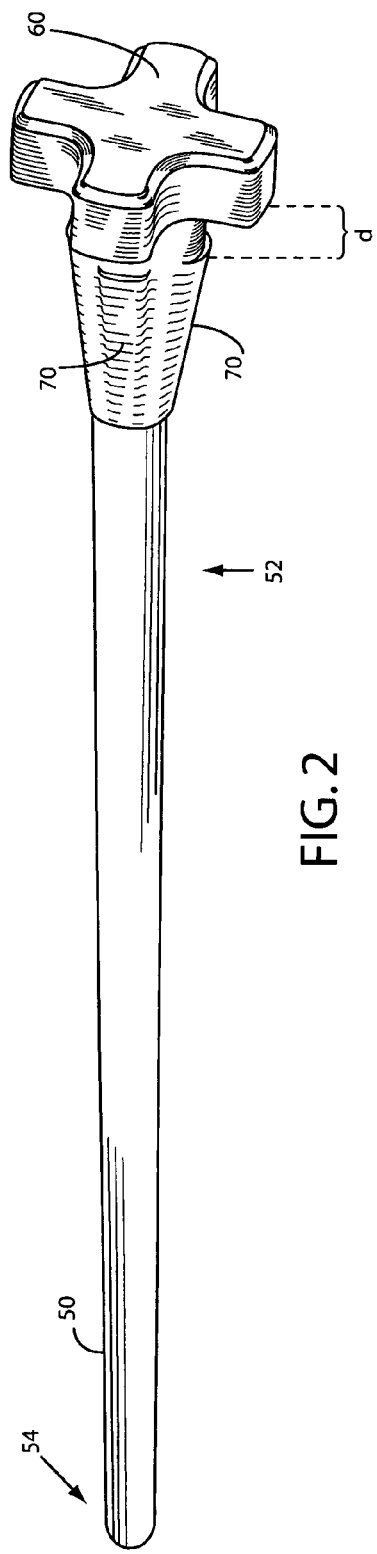
FIG. 2 is a perspective illustration of a lawn mower blade bit of the present invention.

A plurality of elongated, generally cylindrical bits 50 are included for insertion into the bit openings 30 of the blade 20. The bits 50 are preferably made from a durable yet resilient polymer material, such as nylon, high-density polyethylene, or the like. Each bit 50 includes at one end 52 a head 60 (FIG. 2). Each bit 50 further includes, at a distance d from the head 60, a plurality of rib protrusions 70 preferably each tapered away from the end 52. The distance d is slightly larger than the width of the blade 20 at each bit opening 30. As such, each bit 50 may be inserted into one of the bit openings 30 from the bottom side 24 of the blade 20 past the rib protrusions 70 and up against the head 60, the rib protrusions 70 being temporarily deformed while passing the blade 20. As such, each bit 50 is held in place in the bit opening 30 by the rib protrusions 70 and the head 60 (FIGS. 1 and 3). The bits 50, once installed, each extend generally perpendicularly from the top surface 22 of the blade 20.

The bits 50 are each long enough such that when the blade assembly 10 is installed in a lawn mower 80, as depicted in FIG. 5, the distal end 54 of the bits 50 make contact with and bend over slightly against an underside 90 of a blade compartment 88 of the lawn mower 80. As such, when the blade 20 is rotating, centrifugal force compels the distal end 54 of each bit 50 to extend radially outward from the center of the blade 20, yet friction between the bit 50 and the underside 90 of the blade compartment 88 directs each bit 50 to extend tangentially past the trailing edges 28 of the blade 20. A balance is achieved somewhere between the two, such balance being dependent upon the resiliency of the bits 50, the speed of rotation of the blade 20, and the friction caused between the bits 50 and the underside 90 of the blade compartment 88. As such, grass or other lawn debris, particularly wet such debris, is prevented from sticking to and building up upon the underside 90.

In one embodiment of the invention, the pair of bits 50 at the outmost edges of the blade 20 are made from a more flexible material than are the other bits 50. As such, these two bits 50 bend more during rotation of the blade 20 and contact an inner side 100 of the blade compartment 88, preventing grass build-up along the inner side 100 (FIG. 5). A range of resiliencies may be used for the bits 50, the respective resiliencies being determined by the cross-sectional diameter of the bits 50, the materials used to form the bits 50, or a combination of the two. As such, the number of bits 50, the positioning of said bits 50 along the blade 20, and the resiliencies of each bit 50 may be readily optimized for use with various models of lawn mowers 80.

The blade 20 may further include a lifted flange 26 at trailing edges 28 of the blade 20, the lifted flanges 26 providing a high velocity air stream within a blade compartment 88 of the lawn mower 80 to further prevent the build-up of wet grass or the like within the compartment 88. Preferably, the arrangement of the bit opening 30 along the longitudinal axis 40 of the blade 20 is symmetrical with respect to the central mounting opening 25. As such, the bit openings 30 may be formed outside of the longitudinal axis 40 of the blade 20 (not shown), but symmetry is preferred for proper balancing of the blade 20 while rotating. Further, the bits 50 are preferably made from a material that is resilient enough to not create an inordinate amount of additional sound when contacting and scraping along the underside 90 of the blade compartment 88.

While a particular form of the invention has been illustrated and described, it will be apparent from various modifications can be made without departing from the spirit and scope of the invention. For example, while the figures have depicted a blade assembly 10 that includes eight bits 50, using more or fewer bits 50 would not depart from the scope of the present invention as described. Further, a double blade 20 that forms an X-shape could be conceivably used with the present invention without changing the fundamental aspects of the invention. Existing mower blades may be easily retrofitted to accept the bits 50, such as by drilling the bit opening holes 30, in order to afford existing blades the benefits of the present invention. Accordingly, it is not intended that the invention be limited, except as by the appended claims.

What is claimed is:

1. A lawn mower blade and under-deck cleaning assembly for cleaning the under side of the mower blade compartment comprising in operative combination:

a) a generally flat, elongated, main mower blade having cutting edges along opposite longitudinal leading edges and a central mounting opening for securing to a mower motor drive shaft, and a plurality of small bit openings positioned along the longitudinal axis of the blade in the area between the central mounting opening and transverse ends of the blade, the central mounting and bit openings each extending through the blade;

b) a plurality of elongated, generally cylindrical, resilient bits, each bit having a head at one end, a projecting portion having a shoulder disposed spaced from said head by the cross-sectional thickness of said main mower blade, said spacing between said shoulder and said head defining a neck portion, said projecting portion tapering to a flexible, elongated rod portion comprising more than half the length of said bit, said rod portion is slightly smaller in cross-sectional diameter than the diameter of a bit opening of the blade, the head being larger than the diameter of each of the bit openings of the blade to prevent the bit from being pulled through the bit opening; and c) each elongated rod portion of said bit may be inserted into one of the plurality of bit openings from a bottom side of the blade and said projecting portion inserted by force through said bit opening so that each bit is retained at its neck within each bit opening and secured between the head and shoulder of said projecting portion, the elongated rod portion of the bit extending generally upwardly and perpendicularly from a top surface of the blade a length sufficient to flexibly contact the underside of a mower deck under which said main blade is mounted to effect a cleaning action by scraping the underside of said deck as said mower blade is rotated.

2. The lawn mower blade assembly of claim 1 wherein the plurality of bit openings are symmetrically positioned along the blade.

3. The lawn mower blade assembly of claim 1 wherein at least two of the plurality of bit openings are within an inch of each end of the blade.

4. The lawn mower blade assembly of claim 1 wherein the plurality of bit openings are staggered with respect to the longitudinal axis of the blade.

5. The lawn mower blade assembly of claim 1 wherein at least two of the plurality of bits have greater flexibility than the remaining bits, the more flexible bits being positioned nearest the ends of the blade.

6. The lawn mower blade assembly of claim 1 wherein lifted flanges are included at the trailing edges of the blade, the lifted flanges creating a high velocity air stream within the lawn mower when the blade assembly is rotating therein.

7. The lawn mower blade assembly of claim 1 wherein the bit openings in the blade are slightly in diameter than the cross sectional diameter of the neck of each bit, whereby the bits may rotate freely within the bit openings.

8. The lawn mower blade assembly of claim 4 wherein the staggered openings are selected from non-identical spacing along the longitudinal axis of the blade, location on opposite sides of the longitudinal axis of the blade, and combinations of said spacing and said location.

9. The lawn mower blade assembly of claim 1 wherein said bits have a range of resiliencies determined by the cross-sectional diameter of the bits, the materials used to form the bits, or combinations thereof.

10. A bit for insertion in bit-receiving holes through a lawn mower cutting blade comprising:

a) an elongated, generally cylindrical, rod-like member having a flattened head at one end, a projecting portion having a shoulder disposed spaced from said head by the cross-sectional thickness of said mower cutting blade, said spacing between said shoulder and said head defining a neck portion, said projecting portion tapering to a flexible, elongated portion comprising more than half the length of said bit, said elongated portion is slightly smaller in cross-sectional diameter than the diameter of a bit-receiving hole of the blade, the head being larger than the diameter of each of the bit openings of the blade to prevent the bit from being pulled through the bit hole; and b) each bit being configured so that the elongated portion of said bit may be inserted into one of the plurality of bit holes from a bottom side of the blade and said projecting portion inserted by force through said bit hole so that each bit snaps into said hole and is retained at its neck within each bit hole and secured between the head and shoulder of said projecting portion, the elongated portion of the bit extending generally upwardly and perpendicularly from a top surface of the blade a length sufficient to flexibly contact the underside of a mower deck under which said mower cutting blade is mounted to effect a cleaning action by scraping the underside of said deck as said mower blade is rotated.

11. A bit for a lawn mower blade of claim 10 wherein said bit has a resiliency that is selectively determined by the cross-sectional diameter of the elongated portion, the materials used to form the bits, or combinations thereof.

12. A bit for a lawn mower blade of claim 11 wherein said bit protruding portion includes a plurality of ribs extending from said should toward said elongated portion of said bit.

* * * * *